US005618905A

United States Patent [19]
Marsella et al.

[11] Patent Number: 5,618,905
[45] Date of Patent: Apr. 8, 1997

[54] PARTIALLY METHYLATED POLYAMINES AS EPOXY CURING AGENTS

[75] Inventors: John A. Marsella, Allentown; William E. Starner, Nesquehoning; Richard S. Myers, Kutztown, all of Pa.

[73] Assignee: Air Products and Chemicals, Inc., Allentown, Pa.

[21] Appl. No.: 584,937

[22] Filed: Jan. 16, 1996

Related U.S. Application Data

[63] Continuation-in-part of Ser. No. 419,780, Apr. 11, 1995, abandoned.

[51] Int. Cl.[6] ............................ C08G 59/44; C08L 63/00
[52] U.S. Cl. ......................... 528/123; 528/120; 528/407; 525/504; 252/182.13
[58] Field of Search ...................... 252/182.13; 525/504; 528/120, 123, 407

[56] References Cited

U.S. PATENT DOCUMENTS

| | | | |
|---|---|---|---|
| 2,317,757 | 4/1943 | Graf . | |
| 2,642,412 | 6/1953 | Newey et al. | 260/17 |
| 3,280,043 | 10/1966 | Larson et al. | 260/2 |
| 4,051,195 | 9/1977 | McWhorter et al. | 260/837 R |
| 4,521,583 | 6/1985 | Kohli | 528/119 |
| 5,105,013 | 4/1992 | Tanis et al. | 564/473 |

FOREIGN PATENT DOCUMENTS

| | | |
|---|---|---|
| 3803508 | 8/1989 | Germany . |
| 0210322 | 4/1990 | Japan . |

OTHER PUBLICATIONS

A. Gross, "Model Reactions and Model Resins on Epoxy Basis" Dechema—Monographien vol. 119–VHC Verlagsgesellschaft 1990.
Int. J. Adhesion and Adhesives, vol. 8, No. 4, Oct. 1988, 225–233.
J. Appl. Polym. Sci., Vo. 23, 1979, 3433–3444.
C. Caldo, Chem Ind. (Milan), Vo. 61, No. 9, 1979, 639–42.
C. Caldo, Chem Ind. (Milan), vol. 49, No. 10, 1967, 1047–1050.
Williams, John G. "The Beta Relaxation in Epoxy Resin–Based Networks" Journal of Applied Polymer Science, vol. 23 3433–3444 (1979).
Hasegawa, K. "Research Concerning Acrylate–Modified Epoxy Resin" Kagaku to Kogyo 65(8), pp. 351–354 (1991).

*Primary Examiner*—Frederick Krass
*Attorney, Agent, or Firm*—Michael Leach; William F. Marsh

[57] ABSTRACT

A curable epoxy resin composition comprising a polyepoxide resin and an amine curative characterized in that the amine curative comprises a partially methylated polyalkylene polyamine having at least three amine nitrogens and at least two active amine hydrogens.

25 Claims, No Drawings

PARTIALLY METHYLATED POLYAMINES AS EPOXY CURING AGENTS

CROSS-REFERENCE TO RELATED APPLICATIONS

This application is a continuation-in-part of application Ser. No. 08/419,780 filed Apr. 11, 1995, now abandoned.

TECHNICAL FIELD OF THE INVENTION

The present invention relates to aliphatic polyamines useful as curing agents for epoxy resin systems.

BACKGROUND OF THE INVENTION

Epoxy resin systems that cure at ambient or low temperatures are highly desired by the coatings and adhesives industries. Such systems allow application and repair to occur under a wider range of conditions and extend the working season for many construction and repair operations.

In the past, attempts to enhance low and ambient temperature cures have focused on the use of accelerators and catalysts, such as phenol and its Mannich base derivatives, boron trifluoride and its adducts, strong tertiary amine bases, and strong organic acids. An additional approach has been to incorporate another reactive entity into the formulation, such as a low molecular weight acrylate.

These approaches suffer from a variety of defects in that they utilize reagents that are either highly toxic, corrosive, or not wholly compatible with the rest of the epoxy formulation, thus affecting the final physical properties. A particular problem exists with the use of phenol as an accelerator, since it is highly corrosive to skin and is coming under increasing regulatory pressure.

A. Gross and coworkers have published a series of papers and issued one patent regarding the use of N,N'-dimethylethylenediamine. Their work shows that this diamine gives a partial cure at room temperature, but they emphasize a high temperature post cure is required (DE 3 803 508, *Dechema-Monographen*, Vol. 119). This group also published a paper (*Int. J. Adhesion and Adhesives*, Vol. 8, No. 4, Oct. 1988, 225–233) in which they state that secondary amines are less reactive than primary amines. Thus, according to their work, the utility of N,N'-dimethylethylenediamine is that it provides a preliminary, non-crosslinked cure with good workability.

JP 02103221 describes the use of N,N'-dimethylethylenediamine and N,N'-dimethylpropylenediamine in epoxy prepegs.

*J. Appl. Polym. Sci.*, Vol. 23, 1979, 3433–3444 describes the use of poly-N-methyl secondary amines to cure epoxy systems.

U.S. Pat. No. 4,521,583 describes epoxy resin cures effected by using bisurea catalysts derived from poly-N-methyl secondary amines, including N,N'-dimethyl-1,3-propane diamine.

C. Caldo in *Chem. Ind.* (Milan), Vol. 61, No. 9, 1979, 639–42 describes rate studies of bisphenol A diglycidyl ether with aliphatic secondary amines. In Table 2, rate constants are presented for the reaction of N,N'-dialkyl-1,6-hexanediamine with the glycidyl ether of bisphenol A at 200° C. in tetrahydronaphthalene. These data show that under these conditions, the dimethyl derivative is less reactive than either the diisopropyl derivative or the di-n-butyl derivative and only slightly more reactive than the dicyclohexyl derivative.

In *Chem. Ind.* (Milan), Vol. 49, No. 10, 1967, 1047–1050, C. Caldo reports that N,N'-dimethylethylenediamine reacts with the glycidyl derivative of piperazine faster than do other N,N'-dialkyldiamines, but no data is reported for ethylenediamine itself. The only primary diamine reported in the study is 1,8-p-diaminomenthane, which is known to have very low reactivity with epoxides because of steric hindrance in the vicinity of the amino groups.

SUMMARY OF THE INVENTION

The present invention provides partially methylated polyamine compositions as ambient and subambient temperature curing agents, or hardeners, in epoxy systems and curable epoxy compositions comprising a blend of such partially methylated polyamine composition and a polyepoxide. Curing is effected by the use of standard procedures in which the hardener comprises one or more polyamines that have been partially methylated so as to replace 10 to 50% of the amine hydrogens with methyl groups. The partially methylated polyamines used in the present invention are polyalkylene polyamines having at least three amine nitrogens and at least two active amine hydrogen atoms. Active amine hydrogen atoms are those hydrogen atoms which are bonded to an amine nitrogen atom and are capable of reacting with an epoxide.

The partially methylated polyamines demonstrate enhanced reactivity in the polyepoxy resin systems. They also provide for a more controllable gel time and pot life.

DETAILED DESCRIPTION OF THE INVENTION

According to the invention, the partially methylated polyalkylene polyamine has at least three amine nitrogen atoms and at least two active amine hydrogen atoms, and comprises from 4 to 20 carbon atoms. Suitable linear polyalkylene polyamines would be polyethylene polyamines, polypropylene polyamines and the like, but preferably are $C_4$–$C_8$ polyethylene polyamines. Examples of suitable amine curatives include partially methylated diethylenetriamine, partially methylated triethylenetetramine, partially methylated tetraethylenepentamine, partially methylated dipropylenetriamine, partially methylated tripropylenetetramine, and the like. The polyalkylene polyamine composition can be partially methylated to various degrees, such as 10–50%, preferably 15–45%, and most desirably 20–40%, and in various locations on the amine nitrogens on the polyalkylene polyamines. For example, suitable partially methylated diethylenetriamines would include N,N-dimethyldiethylenetriamine, N,N'-dimethyldiethylenetriamine, N,N''-dimethyldiethylenetriamine, N,N',N''-trimethyldiethylenetriamine, N,N,N'-trimethyldiethylenetriamine and N,N,N''-trimethyldiethylenetriamine.

Generally, the partially methylated polyalkylene polyamine compositions are prepared by performing a reductive methylation on the polyalkylene polyamine using appropriate equivalents of formaldehyde in the presence of hydrogen and a hydrogenation catalyst as is well known in the art. The reaction products will comprise mixtures of the polyalkylene polyamine methylated to various degrees. The reaction mixture can be used after simply stripping out water or the selected partially methylated polyalkylene polyamine can be recovered as a substantially pure material by fractional distillation.

The curing agents may be used individually or in combination, as the reaction mixtures or in combination with other curing agents and hardeners well known in the art such as diamines (e.g., di(4-aminocyclohexyl)methane, isophoronediamine and m-xylenediamine), amidoamines and polyamides. When used in combination with other curing agents, or hardeners, the relative amounts would be 10–90 wt % partially methylated polyamines and 90–10 wt % other curing agent, preferably 20–50 wt % partially methylated polyamines and 50–80 wt % other curing agent.

The curing agents, or hardeners, of this invention are useful in applications requiring a relatively thin film of cured epoxy resin, such as coatings and adhesives. They are used to cure resins or mixtures of resins containing epoxy groups. The epoxy resins or epoxy resin mixture may be liquid or solid in nature and have an epoxide equivalent weight (EEW) based on solids of from about 150 to about 1,000, preferably from about 156 to about 700. Usually the resin mixture will consist of di- or polyepoxide resins, such as those resins listed below. The epoxy resin mixture may be modified with a portion of monofunctional epoxides.

The polyepoxy resin component of the curable epoxy composition can be any polyepoxide containing about 2 or more epoxy groups per molecule. Such epoxides are described in Y. Tanaka, "Synthesis and Characteristics of Epoxides," in C. A. May, ed., *Epoxy Resins Chemistry and Technology* (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5pentanediol 1,8-octanediol, 1,10-decanediol, 1,12-dodcecanediol, 1,2-cyclohexanediol, 1,4cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

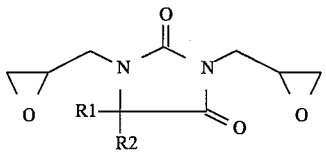

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

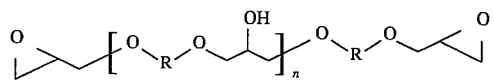

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with a value of n between 0 and about 7. Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic material which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about $C_4$. The novolacs typically are complex mixtures with different degrees of hydroxyl functionality. For the purposes of this invention useful functionalities range from about 2 to about 4.

The preferred polyepoxy compounds are the diglycidyl ethers of bisphenol-A and bisphenol-F, advanced bisphenol-A resins where n is between about 0.1 and about 3, and epoxy novolacs derived from phenol and formaldehyde with an average functionality of about 2 to about 4. Most preferred are diglycidyl ethers of bisphenol-A and diglycidyl ethers of bisphenol-F.

The epoxy resin may be used as is, it may be dissolved in an appropriate solvent, or it may be employed as an already formed emulsion in water or water/cosolvent blend. It will be recognized by those skilled in the art that the use of solvent or a water/cosolvent blend may be required with solid epoxy resins or extremely viscous liquid epoxy resins. The ratio of epoxy groups in the epoxy resin to active amine hydrogens in the hardener can vary from about 0.5 to about 2 and will depend on the nature of the epoxy resin employed and the properties necessary to meet a certain market requirement. With liquid resin, the preferred range is about 0.9 to 1.3, and with solid resin, about 1.2 to 1.6.

Normally, coatings according to this invention will consist of at least two components, one of which contains the epoxy resin, and the other the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol.

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris-(dimethylaminomethyl)phenol.

reaction yield methylated polyamine and the acetaldehyde-containing reaction yielded ethylated polyamine. Throughout the addition, the hydrogen pressure was maintained at 100 psig by means of a pressure regulator. After the targeted amount of aldehyde had been added, the reaction was allowed to proceed for an additional 30–45 min at temperature and pressure. (The products are designated on the basis of the amount of aldehyde added relative to the amount needed for complete alkylation of the N-H bonds. For example, the product derived from adding an equivalent of formaldehyde to one mole of DETA is described as 20% MeDETA, since only 20% of the formaldehyde needed to react all five of the reactive sites in DETA was added.) The reactor was then cooled and vented and the reaction product was filtered and stripped to reduce the water content to less than 0.5%. The details and the reaction conditions for the partial alkylation of the polyamines are summarized in Table 1.

TABLE 1

|  | 20% MeDETA | 40% MeDETA | 20% MeTETA | 20% EtDETA |
| --- | --- | --- | --- | --- |
| Polyamine (g) | 142 | 200 | 200 | 200 |
| Water (g) | 58 | 81 | 82 | 82 |
| 5% Pd/C | 2.8 | 4.0 | 4.1 | 4.0 |
| Formaldehyde (g)[b] | 110 | 315 | 132 | 171[c] |
| Addition time (hr) | 4 | 6.5 | 4 | 4.25 |

[a]80° C., 100 psig $H_2$, 30–45 min. post-addition reaction time.
[b]As a 37 wt %, aqueous solution.
[c]Acetaldehyde as a 50 wt % aqueous solution.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

Thus, the amine curatives, according to the present invention, provide for epoxy resin systems that cure at ambient or low temperatures, i.e., 30° C. or below, especially 0 to 30° C., which are highly desired by the coatings and adhesive industries. Such systems allow application and repair to occur under a wider range of conditions and extend the working season for many construction and repair operations.

EXAMPLE 1

Synthesis of partially alkylated diethylenetriamine (DETA) and triethylenetetramine (TETA):

A 1 L pressure reactor equipped with a stirrer and connected to a regulated source of hydrogen and aldehyde pumping system was charged with DETA or TETA, water, and 5% palladium on carbon catalyst. The reactor was sealed and purged first with nitrogen and then with hydrogen. The reactor was then pressurized to 100 psig with hydrogen. The mixture was heated with stirring to 80° C. and aqueous formaldehyde (~37% by weight) or acetaldehyde (~50% by weight) was pumped in at a rate of 25–50 g/h. Under the hydrogenation conditions, the formaldehyde-containing The amine hydrogen equivalent weights of the products were determined by standard titration techniques in which the solutions were analyzed for primary (1°), secondary (2°), and tertiary (3°) amine content. In addition, GC and GC/MS analysis of a typical reaction wherein formaldehyde was reacted with DETA indicated the presence of a complex mixture of the many possible partially methylated DETA products, as well as other by-products. The reaction products were used in curing studies without further purification. The results of the reactions and analyses are summarized in Table 2.

TABLE 2

| Product | Mol $CH_2O$ / Mol DETA | Amine Content (meq/g) | | | AHEW[a] |
| --- | --- | --- | --- | --- | --- |
|  |  | 1° | 2° | 3° |  |
| 20% MeDETA | 0.2 | 16.3 | 5.7 | 3.2 | 26 |
| 40% MeDETA | 0.4 | 12.9 | 1.3 | 7.6 | 37 |
| 20% EtDETA | 0.2[b] | 14.3 | 6.2 | 1.9 | 29 |
| 20% MeTETA | 0.2[c] | 15.7 | 1.9 | 5.2 | 30 |

[a]Amine hydrogen equivalent calculated from titration data.
[b]Mol acetaldehyde/mol DETA.
[c]Mol formaldehyde/mol TETA.

EXAMPLE 2

The curing agents prepared in Example 1 were mixed with a standard liquid epoxy resin (Epon®828) and evaluated as curing agents in coatings. Thin film set times were obtained using a BK timer after drawing out a 75 micron thick coating on a glass plate. In addition, gel time measurements (ASTM D2471-71 (1979)) at 25° C. (initial temperature) were obtained.

The results summarized in Table 3 show a marked acceleration effect at 5° C. and at 25° C. upon partial methylation of the DETA. Some acceleration is also seen on partially methylating TETA. Partial ethylation of DETA, on the other hand, significantly decreases the efficacy of the curing agent relative to both the methylated material and the unaltered pure DETA.

TABLE 3

| Curing Agent | PHR | Gel Time (min) | Thin Film Set Time 5° C. (hr) | 25° C. (hr) |
| --- | --- | --- | --- | --- |
| DETA | 11 | 41 | 18.5 | >48[a] |
| 20% MeDETA | 14 | 35 | 17 | 9 |
| 40% MeDETA | 19.5 | 40 | 16 | 7 |
| 20% EtDETA | 15 | 45 | >48 | 12.5 |
| TETA | 14.5 | 35 | 19.5 | 18 |
| 20% MeTETA | 16 | 36 | 22 | 7 |
| DETA/BA[b] | 18.5 | 21 | 28.5 | 14 |
| 20% MeDETA/BA[b] | 23 | 36 | 26 | 7 |
| 40% MeDETA/BA[b] | 32.5 | 21 | 18 | 5.5 |
| 20% EtDETA/BA[b] | 25.5 | 17 | >48 | 25.5 |
| TETA/BA[b] | 26.5 | 24 | 27.5 | 5.5 |
| 20% MeTETA/BA[b] | 24 | 27 | 18.5 | 7 |

[a]Very poor film, too tacky to accurately determine set time.
[b]60 wt % curing agent/40 wt % benzyl alcohol.

EXAMPLE 3

The methylated DETA products described in Example 1 were formulated with benzyl alcohol and di(4-aminocyclohexyl)methane (PACM) and used to cure epoxy resin. The diamine known as PACM is well known in the art, but gives relatively slow cures. For comparison, a similar formulation was made with unmodified DETA. Table 4 shows the compositions of the three formulations, with the amount of PACM held constant and the amounts of methylated DETA and benzyl alcohol (BA) adjusted so as to maintain a constant AHEW for the mixture. Also shown are the results of thin-film set time (TFST) experiments using a curing agent loading of 36 phr with Epon 828 resin.

TABLE 4

| FORMULATION | PACM | BA | DETA | 20% MeDETA | 40% MeDETA | TFST (hr) |
| --- | --- | --- | --- | --- | --- | --- |
| 3A | 48 | 40 | 12 | — | — | 8 |
| 3B | 48 | 37 | — | 15 | — | 7.5 |
| 3C | 48 | 31 | — | — | 21 | 6.75 |

The data in Table 4 show that the methylated products can accelerate the cure rates even when used in combination with relatively slow reacting amines.

EXAMPLE 4

Samples of 15% methylated and 45% methylated DETA were prepared as described in Example 1, but with the amount of formaldehyde adjusted so as to give the stated levels of methylation. These materials were then subjected to thin film set time measurements as described in Example 2. The curing agents were prepared as 60/40 amine/benzyl alcohol solutions and were compared with a simultaneous experiment using 60/40 DETA/benzyl alcohol at 25° C. In both cases, the partially methylated DETA samples gave substantially better film appearance than the unmodified curing agent. In this specific experiment, curing conditions were such that the film appearance of the unmodified amine was too poor to measure a thin film set time. (Because small changes in curing conditions can give some changes in cure profile, side-by-side comparisons are best used.) The results are summarized in Table 5.

TABLE 5

| Curing Agent | PHR | Film Appearance[a] | Thin Film Set Time 5° C. (hr) | 25° C. (hr) |
| --- | --- | --- | --- | --- |
| DETA/BA[b] | 18.5 | Tacky | 28.5 | >24 |
| 15% MeDETA/BA[b] | 21.5 | Hazy | 39.5 | 14.75 |
| 45% MeDETA/BA[b] | 35.5 | Glossy | 20 | 5 |

[a]At 25° C.
[b]60 wt % curing agent/40 wt % benzyl alcohol.

The invention works by taking advantage of the special features of the methyl group which adds the electron density to the amine group without adding significantly to the steric hindrance, thus increasing the nucleophilicity of the amine.

This approach is superior to that known in the art because it achieves enhanced reactivity without the addition of nonamine co-hardeners or accelerators. The partially methylated polyamines are no more corrosive than typical amine hardeners and are chemically incorporated into the polymer matrix so as not to provide emission of volatiles from the cured system.

STATEMENT OF INDUSTRIAL APPLICATION

The present invention provides partially methylated polyamine compositions for use as ambient and subambient temperature curing agents and hardeners in epoxy systems.

We claim:

1. An amine curative composition for epoxy resins consisting essentially of a partially methylated polyalkylene polyamine which is 10 to 50% methylated, the polyalkylene polyamine having at least three amine nitrogens and at least two active amine hydrogens and at least one additional curing agent or hardener selected from the group consisting of diamines, amidoamines and polyamides.

2. The amine curative composition of claim 1 consisting essentially of a mixture of partially methylated polyalkylene polyamines.

3. The amine curative composition of claim 1 in which the polyalkylene polyamine is a $C_4$–$C_8$ polyethylene polyamine.

4. The amine curative composition of claim 1 in which polyalkylene polyamine is selected from the group consisting of diethylenetriamine, triethylenetetramine, tetraethylenepentamine, dipropylenetriamine and tripropylenetetramine.

5. The amine curative composition of claim 1 in which the partially methylated polyalkylene polyamine is selected from the group consisting of N,N-dimethyldiethylenetriamine, N,N'-dimethyldiethylenetriamine, N,N"-dimethyldiethylenetriamine, N,N',N"-trimethyldiethylenetriamine, N,N,N'-trimethyldiethylenetriamine, N,N,N"-trimethyldiethylenetriamine and mixtures thereof.

6. The amine curative composition of claim 1 in which the polyalkylenepolyamine is 15 to 45% methylated.

7. The amine curative composition of claim 1 in which the polyalkylenepolyamine is 20 to 40% methylated.

8. The amine curative composition of claim 1 which also contains one or more organic solvents.

9. The amine curative composition of claim 5 which also contains one or more organic solvents.

10. The amine curative composition of claim 6 which also contains one or more organic solvents.

11. A curable liquid epoxy resin composition comprising in liquid medium a polyepoxide resin and an amine curative characterized in that the amine curative composition consists essentially of a partially methylated polyalkylene polyamine which is 10 to 50% methylated, the polyalkylene polyamine having at least three amine nitrogens and at least two active amine hydrogens.

12. The curable liquid epoxy resin composition of claim 11 in which the polyalkylene polyamine is selected from the group consisting of diethylenetriamine, triethylenetetramine, tetraethylenepentamine, dipropylenetriamine and tripropylenetetramine.

13. The curable liquid epoxy resin composition of claim 11 in which the partially methylated polyalkylene polyamine is selected from the group consisting of N,N-dimethyldiethylenetriamine, N,N'-dimethyldiethylenetriamine, N,N''-dimethyldiethylenetriamine, N,N',N''-trimethyldiethylenetriamine, N,N,N'-trimethyldiethylenetriamine, N,N,N''-trimethyldiethylenetriamine and mixtures thereof.

14. The curable liquid epoxy resin composition of claim 11 which also contains at least one additional curing agent or hardener selected from the group consisting of diamines, amidoamines and polyamides.

15. The curable liquid epoxy resin composition of claim 13 which also contains at least one additional curing agent or hardener selected from the group consisting of diamines, amidoamines and polyamides.

16. The curable liquid epoxy resin composition of claim 11 which also contains one or more organic solvents.

17. The curable liquid epoxy resin composition of claim 13 which also contains one or more organic solvents.

18. The curable liquid epoxy resin composition of claim 15 which also contains one or more organic solvents.

19. The curable liquid epoxy resin composition of claim 11 in which the amine curative consists essentially of a mixture of partially methylated polyalkylene polyamines.

20. The curable liquid epoxy resin composition of claim 11 in which the partially methylated polyalkylene polyamine is a partially methylated $C_4$–$C_8$ polyethylene polyamine.

21. A method which comprises curing the epoxy resin composition of claim 11 at 30° C. or below.

22. A method which comprises curing the epoxy resin composition of claim 12 at 30° C. or below.

23. A method which comprises curing the epoxy resin composition of claim 13 at 30° C. or below.

24. A method which comprises curing the epoxy resin composition of claim 14 at 30° C. or below.

25. A method which comprises curing the epoxy resin composition of claim 15 at 30° C. or below.

* * * * *